(No Model.)

J. THOMPSON.
DEVICE FOR PREVENTING HORSES GETTING THEIR TAILS OVER THE LINES.

No. 313,254. Patented Mar. 3, 1885.

WITNESSES:
A. G. Morey
Adolf Heile

INVENTOR
Jasper Thompson,
BY G. L. Chapin
ATTORNEY

UNITED STATES PATENT OFFICE.

JASPER THOMPSON, OF FOREST CITY, IOWA.

DEVICE FOR PREVENTING HORSES GETTING THEIR TAILS OVER THE LINES.

SPECIFICATION forming part of Letters Patent No. 313,254, dated March 3, 1885.

Application filed November 6, 1884. (No model.)

*To all whom it may concern:*

Be it known that I, JASPER THOMPSON, a citizen of the United States, and a resident of Forest City, in the county of Winnebago and State of Iowa, have invented new and useful Improvements in Devices to Prevent Horses from Getting their Tails over the Lines, of which the following is a specification, reference being had to the accompanying drawings, illustrating the invention, in which—

Figure 1:
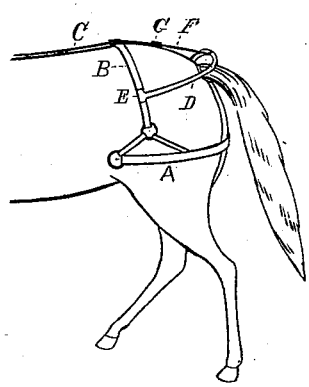
Figure 2:
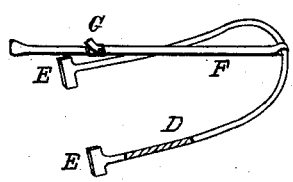
Figure 3:
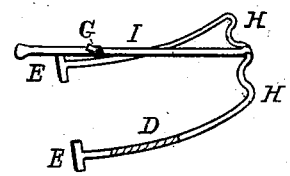

Figure 1 shows the rear portion of a harness provided with my device in position as it is used on a horse; Fig. 2, a perspective view of the device removed from the harness. Fig. 3 presents the same device with the addition of projections for supporting the lines.

The purpose of the present invention is to provide simple and effectual and cheap means for preventing horses from getting their tails over the lines, in contradistinction to ordinary devices for this purpose, which are complicated and expensive. I employ a bail-shaped guard, which is preferably made of wire rope covered with leather, the leather projecting over the ends of the wire rope to form flexible joints to be attached to the hip-straps of the harness.

The means for holding the bail to a desired height above the tail of the horse is an adjustable strap connected to the center of the bail and to the back-strap. The object of making this strap adjustable is that the bail can be elevated or lowered to suit different-sized horses or harness.

A represents the breeching, B the hip-straps, and C the rear portion of the back-strap, of an ordinary harness.

D represents what I term a "bail," which is preferably made of spring-wire rope covered with leather, the ends of the leather projecting beyond the ends of the wire rope to form flaps E, which are fastened to the hip-straps by waxed thread or rivets, as desired. The bail must be stiff enough to resist the pressure of the lines when they are held taut, and it should project far enough beyond the base of the tail and so far laterally that the muscle of the tail cannot draw the lines under it.

For heavy draft-harness the bail may be made entirely of metal, in which case the ends must be attached to the hip-straps B by hinges or pivot-rivets, so as to operate the same as the yielding joint of leather. The object of these yielding joints is that the movement of the bail will not twist the hip-straps.

F represents an adjusting-strap, which connects the center part of the bail D with the back-strap C. This strap is made of two pieces of leather and connected by a buckle, G, by which the strap is lengthened to lower the bail or shortened to raise it, as may be desired, to adjust the bail properly to keep the lines out of reach of the horse's tail.

At Fig. 3 the bail is shown with its central part bent at H H to form supports and guides for the reins, which in many cases and by many drivers is desirable. This form of bail is especially desirable where the lines are held by the driver below the height of the bail, which is the case where low vehicles are used.

Where the support or guides H are formed in the bail, and the lines are held taut thereon, a considerable force is exerted downwardly on the bail, and it is therefore held in a position better to resist this action by being attached quite closely to the breeching. In practice I prefer that the middle portions of the bail over the tail be somewhat curved upward, which allows the other portions of the bail to come closer to the animal, thus removing an objection there might be to the appearance of the device. There is no objection to the attaching of the device to the breeching except that it would require too long a bail and the style would be objectionable.

Having thus fully described my invention, what I claim, and desire to secure by Letters Patent, is—

A flexible bail, D, formed with line-supports H H, attached to the harness, as specified, and supported above the tail by an adjustable strap, F, substantially as and for the purpose specified.

JASPER THOMPSON.

Witnesses:
J. F. THOMPSON,
P. M. JOICE.